United States Patent
Saitoh et al.

(10) Patent No.: US 6,955,280 B2
(45) Date of Patent: Oct. 18, 2005

(54) CELLULAR PHONE SECURING DEVICE AND ONBOARD HOLDER FOR VEHICLE USE

(75) Inventors: Eiji Saitoh, Yokohama (JP); Keigo Matsuura, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/214,067

(22) Filed: Aug. 7, 2002

(65) Prior Publication Data

US 2003/0029976 A1 Feb. 13, 2003

(30) Foreign Application Priority Data

Aug. 8, 2001 (JP) ............... 2001-240700

(51) Int. Cl.[7] ............................... A45F 5/00
(52) U.S. Cl. ............... 224/269; 224/197; 224/483; 224/547; 224/553; 224/557; 224/929; 224/930; 248/226.11; 379/446
(58) Field of Search ............... 248/226.11, 229.16, 248/223.14, 224.61, 224.7; 224/246, 929, 224/930, 197, 269, 483, 277, 282, 547, 553, 224/557; 379/446, 454

(56) References Cited

U.S. PATENT DOCUMENTS

| | | | | |
|---|---|---|---|---|
| 4,299,344 A | * | 11/1981 | Yamashita et al. | 224/242 |
| 4,828,153 A | * | 5/1989 | Guzik et al. | 224/242 |
| 4,956,895 A | * | 9/1990 | Hayasaka | 24/3.11 |
| 5,054,170 A | * | 10/1991 | Otrusina | 24/580.11 |
| 5,356,060 A | * | 10/1994 | Kuroda | 224/670 |
| 5,730,342 A | * | 3/1998 | Tien | 224/271 |
| 5,833,100 A | * | 11/1998 | Kim | 224/197 |
| 5,850,954 A | * | 12/1998 | Dong-Joo | 224/197 |
| 5,850,996 A | * | 12/1998 | Liang | 248/221.11 |
| 5,906,031 A | * | 5/1999 | Jensen | 24/3.12 |
| 6,006,969 A | * | 12/1999 | Kim | 224/197 |
| 6,059,156 A | * | 5/2000 | Lehtinen | 224/197 |
| 2002/0100782 A1 | * | 8/2002 | Marvin | 224/483 |

* cited by examiner

Primary Examiner—Ramon O Ramirez
(74) Attorney, Agent, or Firm—Pearne & Gordon LLP

(57) ABSTRACT

A cellular phone securing device is mounted on a carrying holder to be fixed to a belt or clothes or on an onboard holder installed in an interior of a vehicle. The cellular phone securing device includes a projecting shaft disposed erect on the surface of a main body portion thereof to be fixed to and held by the carrying holder or the onboard holder, and a securing pawl and a securing metal member respectively projecting from at least two positions of one and the other end portions of the back surface side of the main body portion. While securing the cellular phone by these securing pawl and metal member, the cellular phone securing device is mounted on the cellular phone in such a manner that the main body sits astride a cellular phone between at least two positions of a casing of the cellular phone.

11 Claims, 8 Drawing Sheets

CELLULAR PHONE SECURING DEVICE AND ONBOARD HOLDER FOR VEHICLE USE

BACKGROUND OF THE INVENTION

1. Field of the Invention

The present invention relates to a cellular phone securing device capable of securing a cellular phone to a belt or clothes of a user through a carrying holder and relates to an onboard holder for firmly fixing and holding a cellular phone to the interior of a vehicle using the cellular phone securing device.

2. Description of the Related Art

In the case of a cellular phone, as known well, in order for a user to be able to carry it anywhere and use it at desired places, cellular phone manufacturers have come up with some contrivances to enhance the portability thereof; for example, the size of the cellular phone has been reduced. Owing to this, at the present time, the user is able to carry the cellular phone with him or her while storing it in the pocket of the clothes of the user or in a bag carried by the user.

When the user carries the cellular phone while storing it in the pocket of the clothes of the user, depending on the posture of the user, there is a fear that the cellular phone can slip off the pocket to be thereby lost or damaged.

Accordingly, as means for preventing the above slippage of the cellular phone, for example, there are known a strap with a clip for fastening the cellular phone to the clothes of the user with the clip, and a carrying holder for holding the cellular phone to the belt of the user using spring forces.

For example, as a carrying holder of this type, there is known a carrying holder structured in the following manner: that is, as the mating member of the carrying holder, there is used a securing device which is fixed to the back surface portion of a casing of a cellular phone with adhesive tape or adhesives; and, a shaft portion provided on and projected from the securing device is pushed down along the U-shaped guide portion of the carrying holder into the lower portion (the deep portion) thereof to be thereby secured to a fixing projection disposed in the lower-most portion (the deepest portion) of the carrying holder.

However, when using such securing device, as described above, it is necessary to stick the securing device to the casing portion of the cellular phone and thus, once the securing device is stuck to the cellular phone, it is not easy to remove the former from the latter.

Also, in some cellular phones, on the casing portion thereof on which the securing device is to be mounted, there are disposed a speaker and various operation buttons. Therefore, there is left no space proper to mount the securing device thereon. In this case, it is impossible to use the securing device.

When using the cellular phone while the carrying holder is stuck to a belt, preferably, the securing device for a cellular phone may be freely rotated with respect to the carrying holder. This is because when the casing portion of the cellular phone is contacted with a portion of the body of a user such as the stomach of the user, the casing portion can be pushed out and rotated with respect to the carrying holder to be thereby removed from its contact state with the body of the user. On the other hand, in the case of a cellular phone which is mounted on the carrying holder through the securing device, on the upper portion of the back surface portion of the casing of the cellular phone where the securing device is to be mounted, normally, there is provided an antenna in such a manner that it is in part projected upwardly from the back surface portion.

Therefore, in order to prevent the antenna from being contacted with the carrying holder, it is necessary to project the shaft portion of the securing device from the securing device to a rather great degree. Thus, when the cellular phone is removed from the carrying holder, the securing device projects from the casing portion of the cellular phone to such great degree and thus becomes bulky. This raises a possibility that the securing device can interfere with holding or using of the cellular phone. That is, the securing device can make the cellular phone difficult to use.

Further, conventionally, there are also used various kinds of onboard holders each of which is disposed in the interior of a vehicle such as a car for holding a cellular phone using the securing device secured to the cellular phone as it is. However, such onboard holders are normally unable to fix the securing device firmly: in other words, most of them are structured such that as the car jolts, the cellular phone trembles greatly. Therefore, in this case, for example, while the cellular phone remains mounted on the onboard holder, a key operation is difficult to carry out. Also, when braking the vehicle suddenly, there is a fear that a great force can be applied to the cellular phone to thereby cause it to collide with something in the interior of the vehicle. Further, when the cellular phone is caused to tremble, the cellular phone is difficult to take out from the onboard holder; that is, the securing device can make the cellular phone hard to use.

SUMMARY OF THE INVENTION

The present invention aims at eliminating the drawbacks found in the above-mentioned conventional securing device and onboard holder for a cellular phone. Accordingly, it is an object of the invention to provide an easy-to-use cellular phone securing device which not only can be mounted onto the back surface of a casing of a cellular phone even in a case where a speaker is disposed on such back surface portion, but also can reduce the projecting amount thereof as much as possible without interfering with the antenna.

Also, it is another object of the invention to provide an onboard holder which not only, when a cellular phone securing device is mounted on the interior of a vehicle, can firmly fix and hold a cellular phone in the interior of the vehicle but also, as the need arises, allows the cellular phone securing device to be mounted on is and removed from the onboard holder.

In attaining the above objects, according to a first aspect of the invention, there is provided a cellular phone securing device mountable onto a carrying holder to be fixed to a belt or clothes of a user or onto an onboard holder installed in the interior of a vehicle to thereby hold a cellular phone, the cellular phone securing device, including:

a holding member disposed erect on the surface or a main body portion of the cellular phone securing device to be fixed to or held by the carrying holder or onboard holder; and a securing portion projected from at least two positions of the main body portion and securable to at least two positions of a casing of the cellular phone to thereby be able to secure the main body portion of the cellular phone securing device while keeping it not in contact with the casing of the cellular phone.

Owing to this, even in a case where a speaker is installed in the back surface portion of a casing of a cellular phone, the cellular phone securing device can be mounted on the cellular phone in such a manner that it keeps away from the speaker.

According to a second aspect of the invention, the holding member, which is disposed erect on the surface of the main body portion, may preferably be a cylindrical-shaped projecting shaft.

Owing to this, in a state where a cellular phone is secured, the cellular phone can be freely rotated with respect to the cellular phone securing device with the projecting shaft as a center of rotation thereof.

Also, according to a third aspect of the invention, the securing portion may also include a first securing member to be secured to an erect surface of the edge portion of a battery-storing recessed portion formed on the back surface side of the casing of the cellular phone, and a second securing member to be secured to a recessed portion formed in one end face of the casing.

According to this structure, the cellular phone securing device can be positively fixed to the back surface side of the casing of the cellular phone simply by securing it to at least two portions of the cellular phone, that is, even with a simple structure.

Further, according to a fourth aspect of the invention, the projecting shaft disposed erect on the surface of the main body portion may preferably include a securing hole into which a fixing projection disposed on the carrying holder can be rotatably fitted, and also the securing hole may be open in the central portion of the upper surface thereof.

Owing to this, the projecting shaft can be secured to the fixing projection in such a manner that it can be rotated.

According to a fifth aspect of the invention, the cellular phone securing device, preferably, may be inclinedly mounted so that the area of provision of the projecting shaft can be spaced by the maximum distance from the surface of the carrying holder on which the cellular phone securing device is to be mounted.

Owing to this, in a case where the projecting shaft is disposed in the vicinity of an antenna and the distance between the antenna and carrying holder is kept in the minimum distance which can prevent them from touching each other, when the cellular phone is rotated about the projecting shaft, with the projecting shaft projected up to the minimum height, the antenna can be prevented from touching any part of the carrying holder.

According to a sixth aspect of the invention, the upper surface portion of the projecting shaft may preferably have a shape inclined such that it lowers in height toward the central portion of the main body portion with respect to the longitudinal direction of the main body portion.

This can realize the fifth aspect of the invention with a simple structure.

According to a seventh aspect of the invention, there is provided an onboard holder installable in the interior of a vehicle and capable of mounting immovably and removably thereon a cellular phone securing device fixed to and held by a cellular phone, wherein, on the front surface side of a main body portion of the onboard holder, there is disposed a holding and mounting member for sandwichingly holding and mounting the cellular phone securing device in at least two positions thereof.

Owing to the seventh aspect of the invention, when the cellular phone securing device is mounted on the onboard holder, the cellular phone can be firmly fixed to and held in the interior of a vehicle and, at the same time, as the need arises, the cellular phone securing device can be easily mounted onto and removed from the onboard holder.

Also, according to an eighth aspect of the invention, the holding and mounting member may also include a mounting portion for sandwiching and mounting a projecting shaft from both sides with spring forces and a holding portion capable of receiving a projection portion disposed on the cellular phone securing device to thereby sandwich and hold the projection portion.

Owing to this, the holding and mounting member can be formed in a simple structure.

Further, according to a ninth aspect of the invention, preferably, on the front surface side of a main body portion of the onboard holder, there may be formed a stepped portion having a height corresponding to the expansion amount of the antenna portion of a cellular phone expanded from the surface of a casing of the cellular phone.

Owing to this, even when the antenna is expanded laterally from the casing of the cellular phone, the cellular phone securing device can be positively mounted on the onboard holder.

According to a tenth aspect of the invention, preferably, there may be further included an inclining member for mounting the main body portion inclinably onto the base portion of the onboard holder to be fixed to the vehicle body side.

Owing to this, the onboard holder can be disposed according to the taste of a user, which enhances the easy-to-use characteristic of the onboard holder.

Also, according to an eleventh aspect of the invention, preferably, the cellular phone securing device may be a cellular phone securing device as set forth in any one of the first to sixth aspects of the invention.

Due to this, the present cellular phone securing device can be used for both of the personal carrying holder and onboard holder.

DETAILED DESCRIPTION OF THE PREFERRED EMBODIMENTS

Now, description will be given below in detail of the preferred embodiments of a cellular phone securing device and an onboard holder according to the invention with reference to the accompanying drawings.

[First Embodiment]

Figure 1:
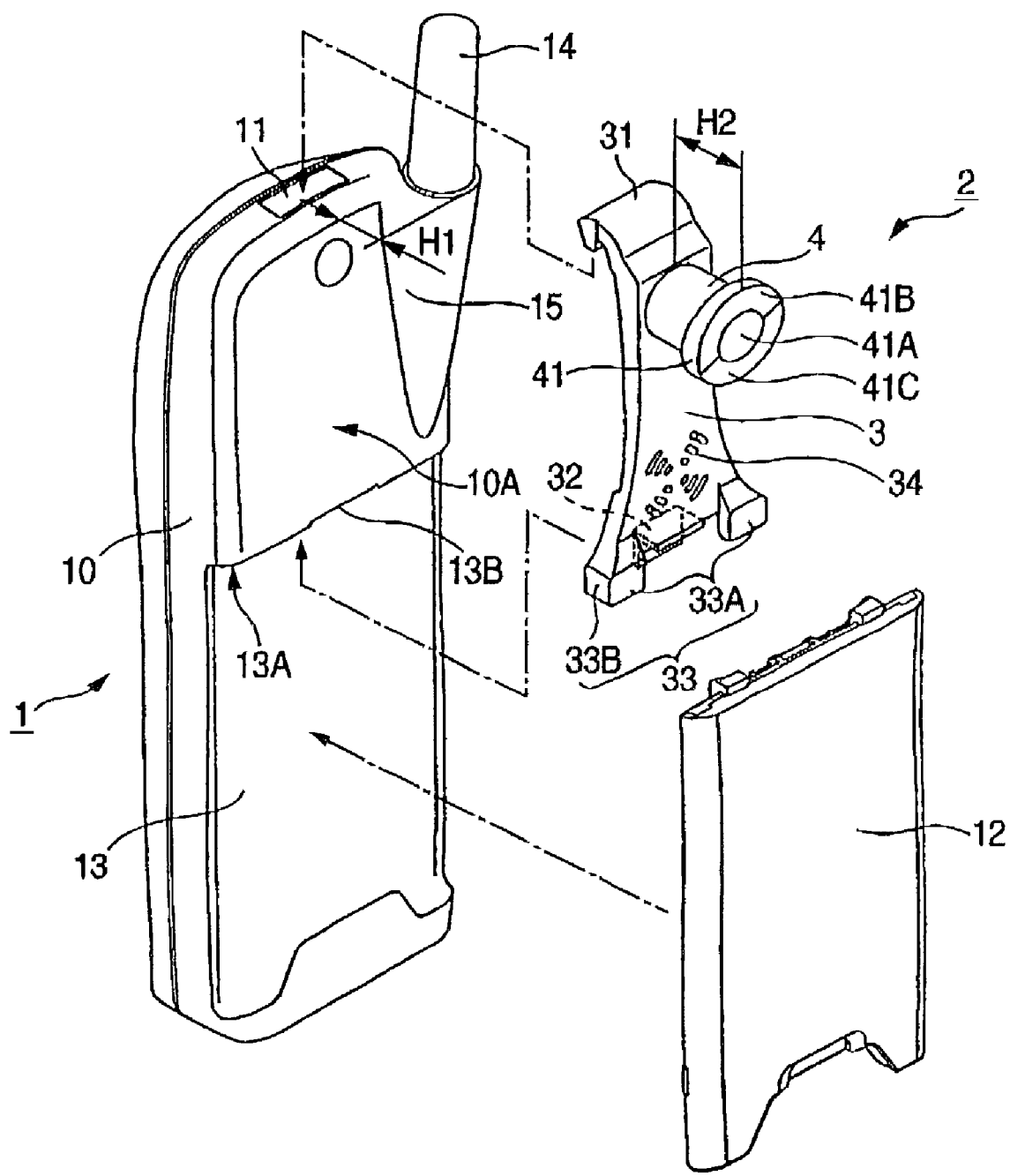
FIG. 1 is an exploded perspective view of a cellular phone securing device according to a first embodiment of the invention and a cellular phone to which the cellular phone securing device is to be fixed.

FIG. 1 shows a cellular phone securing device 2 according to a first embodiment of the invention. The cellular phone securing device 2 according to the present embodiment is not only to be fixed to a cellular phone 1 but also to be mounted on a carrying holder 5 (see FIG. 3); and, the cellular phone securing device 2 includes a main body portion 3 with securing members disposed thereon and a projecting shaft 4 serving as a holding member.

The securing device 2 is to be mounted on the back surface portion 10A of a casing of the cellular phone 1. Therefore, in the central portion of one end (upper end) portion of the cellular phone 1, there is formed a recessed portion 11 to which a securing pawl 31 (which will be discussed later) can be secured. Also, in the back surface portion 10A of the cellular phone 1, there is formed a recessed portion 13 in which a battery mounted on the back surface of a battery cover 12 can be stored. In the central portion of one erect surface 13A of the recessed portion 13, there is formed a cutaway portion 13B into which a securing metal member 32 (which will be discussed later) can be inserted.

Further, in the case of the cellular phone 1, on the upper portion side of the casing back surface 10A thereof, there is formed an expansion portion 15 for storing therein the base portion of an antenna 14 in such a manner that the expansion portion 15 projects from the back surface 10A by such height Hi as shown in FIG. 1.

The main body portion 3 is made of proper metal or synthetic resin into a substantially triangular-shaped sheet or a substantially trapezoidal-shaped sheet. On one end (upper end) portion and on the other end (lower end) portion of the main body portion 3, there are projectingly disposed a securing pawl (first securing member) 31 and a securing metal member (second securing member) 32, respectively. Also, on the right and left portions of the other end portion side of the main body portion 3 with the securing metal member 32 disposed thereon, there is disposed a projection portion 33 to be fixed to and held by an onboard holder 6 (which will be discussed later).

The securing pawl 31 is structured in such a manner that its section, which is obtained when it is cut in its thickness direction, has a substantially U shape (or a C shape) and it projects from one end (upper end) portion of the main body portion 3 in the back surface direction thereof. Also, the securing pawl 31 is also structured such that, when it is mounted together with the securing metal member 32 on the cellular phone 1, the main body portion 3 is raised up in a bridge manner with respect to the back surface 10A of the casing of the cellular phone 1 (or sits astride the casing back surface 10A in an arch manner), while the back surface of the main body portion 3 can be kept not in contact with the casing back surface 10A (or can be kept in slight contact with the casing back surface 10A).

The securing metal member 32 is made of a sheet-like metal plate into a member having a substantially L-shaped section and, similarly to the securing pawl 31, the securing metal member 32 is mounted on the main body portion 3 in such a manner that it raises the main body portion 3 in a bridge manner (or in an arch manner).

Referring to the projection portion 33, actually, two projection portions 33 are provided respectively in the corner portions of the two sides of the other end portion of the cellular phone securing device 2 and, in order that they can be immovably fixed to the main body portion 7 of the onboard holder device 6, the projection portions 33 are structured so as to project in two directions. According to the present embodiment, each of the projection portions 33 is formed in a substantially L-like shape and, as shown in FIG. 1, it includes two horizontal members 33A projecting in the horizontal direction and a vertical member 33B projecting in the height direction which is perpendicular to the projecting direction of the horizontal members 33A.

Further, in view of the fact that there is formed a sound hole for (not shown) for a speaker in part of the back surface 10A of the casing of the cellular phone 1 on which the cellular phone securing device 2 can be mounted, in the area of the middle portion of the main body portion 3 that corresponds to a position just above the sound hole of the back surface 10A, there is opened up a hole 34 which is used to facilitate the reverberation of the sound.

The projecting shaft 4 has a hollow cylindrical shape and is fixed to the main body portion 3 in such a manner that it projects from the surface of the main body portion 3 by such height H2 as shown in FIG. 1. In the upper end portion of the projecting shaft 4, there is formed a flange portion 41 and, in the central portion of the upper surface of the flange portion 41, there is opened up a securing hole 41A; and, in a case where a fixing projection formed in the carrying holder 5 (which will be discussed later) is inserted into the securing hole 41A portion of the projecting shaft 4, the cellular phone securing device 2 can be prevented against removal from the carrying holder 5.

Figure 2:
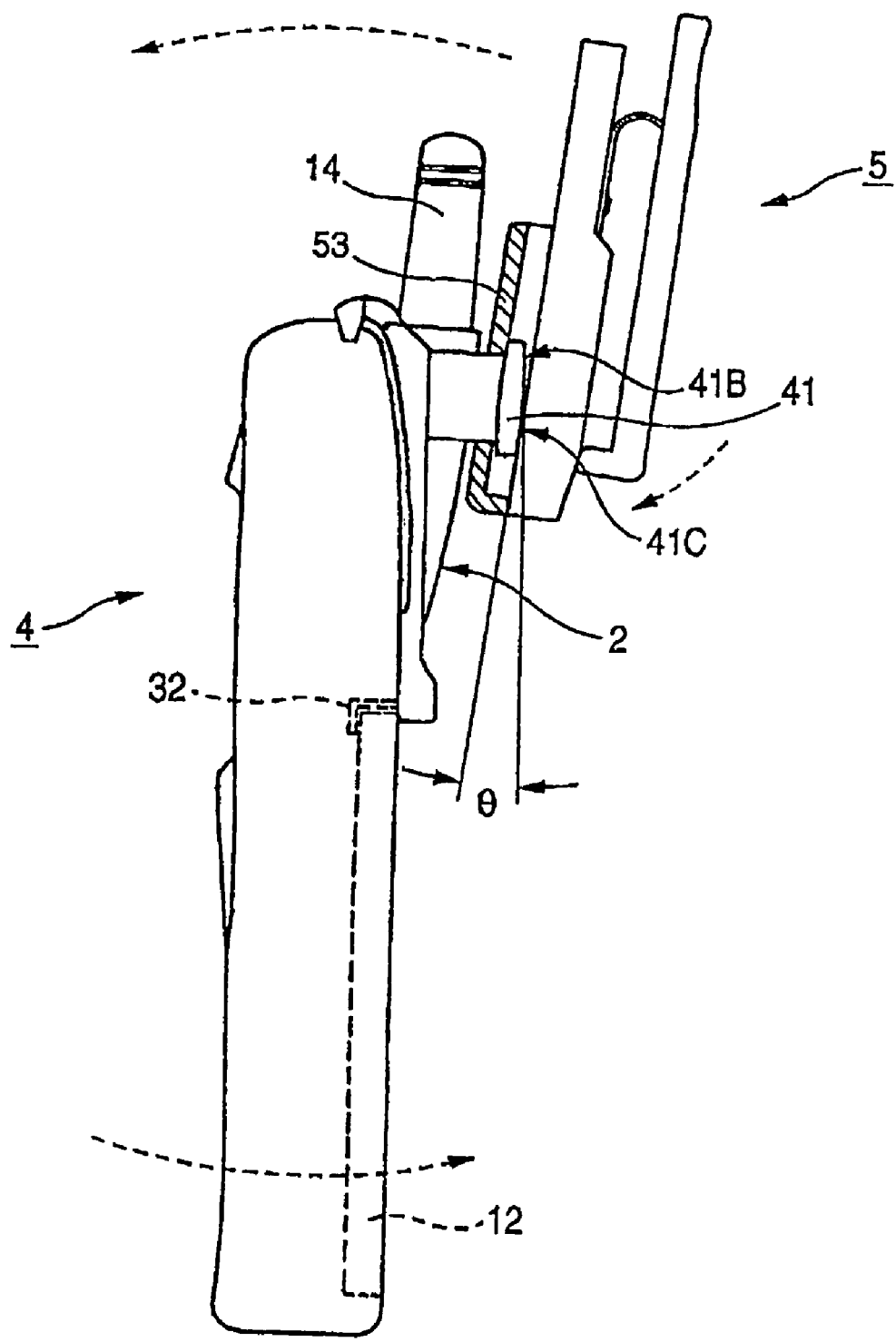
FIG. 2 is an explanatory view of a state in which the cellular phone securing device according to the first embodiment shown in FIG. 1 is mounted on the cellular phone.
Figure 9:
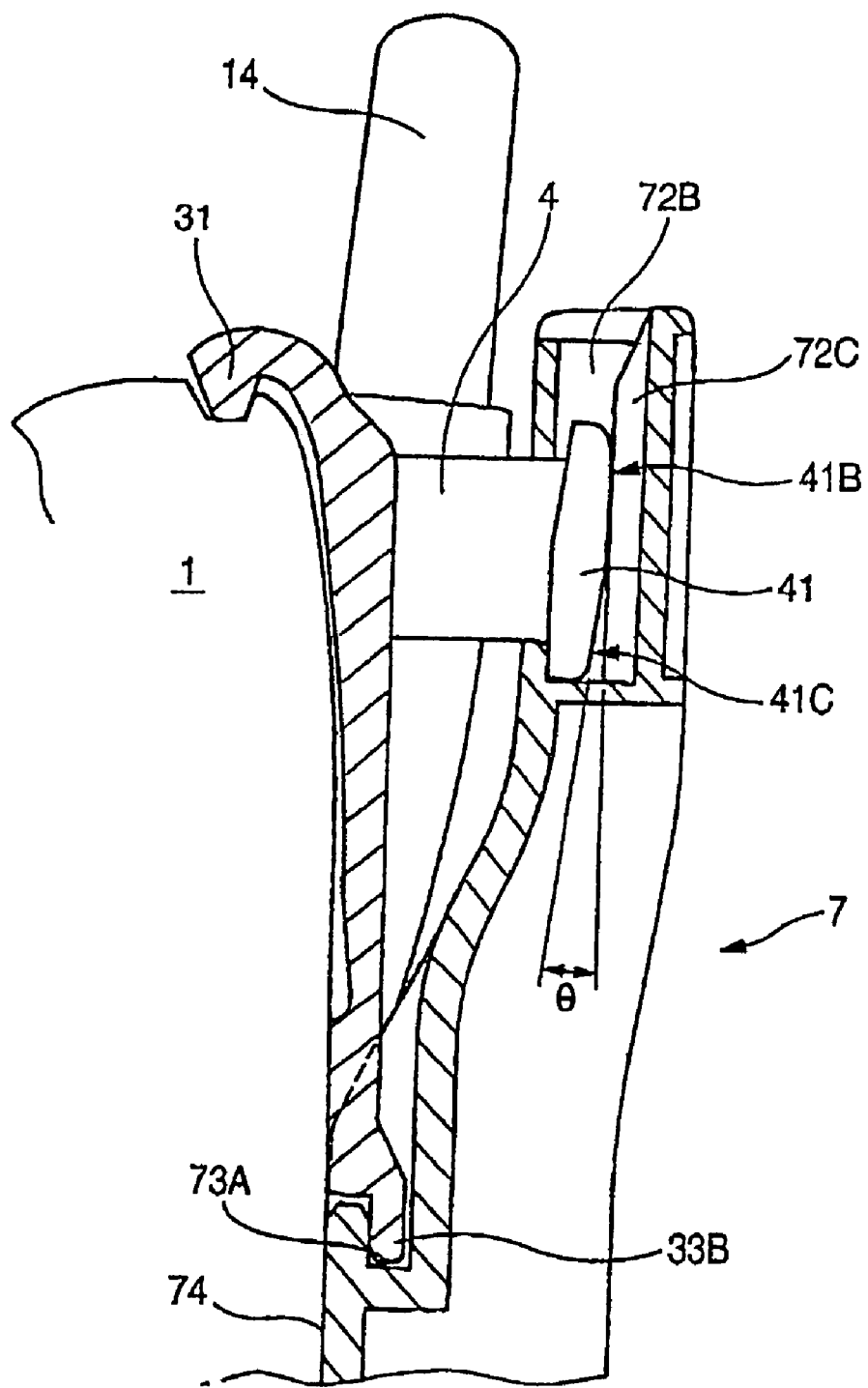

Also, according to the present embodiment, the upper surface portion of the flange portion 41 is structured such that, as shown in FIG. 2, an upper half section 41B thereof extending from the central portion thereof has a plane (a horizontal surface) which is substantially parallel to the back surface portion of the cellular phone 1, while a lower half section 41C thereof has an inclined shape inclined downward (near to the back surface 1A of the cellular phone 1) by an angle of θ (similarly, see FIG. 9) with respect to the back surface portion of the cellular phone 1. In the case of the projecting shaft 4 having the thus structured flange portion 41, even in case where it is not projected long from the main body portion 3, as shown in FIG. 2, when the cellular phone 1 is rotated with respect to the carrying holder 5, an antenna 14 disposed on the casing back surface 10A of the cellular phone 1 can be prevented against contact with the carrying holder 5.

That is, when the cellular phone 1 is rotated about the projecting shaft 4 with respect to the carrying holder 5, the cellular phone 1 is rotated in such a manner that the upper end portion of the casing 10 with the antenna 14 mounted thereon is normally more distant from the carrying holder 5 than the lower end portion of the casing 10, in other words, in such a manner that the upper end portion of the casing 10 is raised by an angle of θ with respect to the carrying holder 5 (see FIG. 2).

Figure 3:
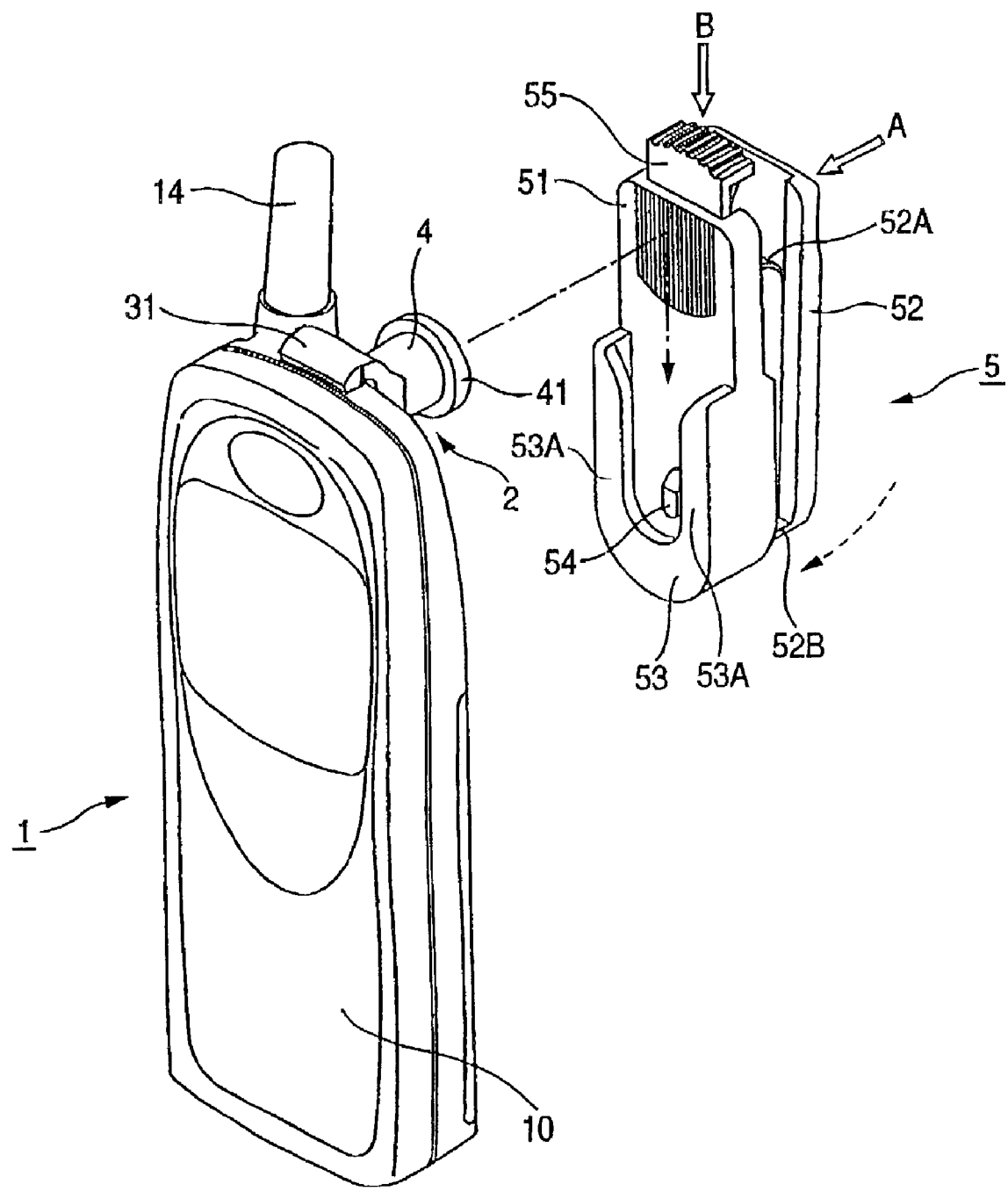
FIG. 3 is a perspective view of the cellular phone securing device according to the first embodiment shown in FIG. 1, showing a state in which it is mounted on the cellular phone.

On the other hand, the carrying holder 5, as shown in FIG. 3, generally, includes a main body portion 51, a mounting portion 52, a guide portion 53, a fixing projection 54, and a lock removing portion 55.

The main body portion 51 is formed in a long and narrow shape which is long in the vertical direction in FIG. 3 and, in the surface portion of the main body portion 51, there is formed the guide portion 53 which projects therefrom in a substantially U-shaped manner. The guide portion 53 includes a pair of guide walls 53A respectively formed along the two side edge portions of the main body portion 51 extending in parallel to the longitudinal direction of the main body portion 51; and, when mounting the cellular phone securing device 2 onto the carrying holder 5, the projecting shaft 4 can be slid and guided downward by the guide walls 53A. Also, on the guide portion 53, there is provided the fixing projection 54 (which will be discussed later): that is, in a case where the projecting shaft 4 is moved down to the lower-most portion (the deepest portion) of the guide portion 53, the projecting shaft 4 can be fixed (locked) by the fixing projection 54 that is present on the lower-most (the deepest side) of the guide portion 53.

Figure 4:
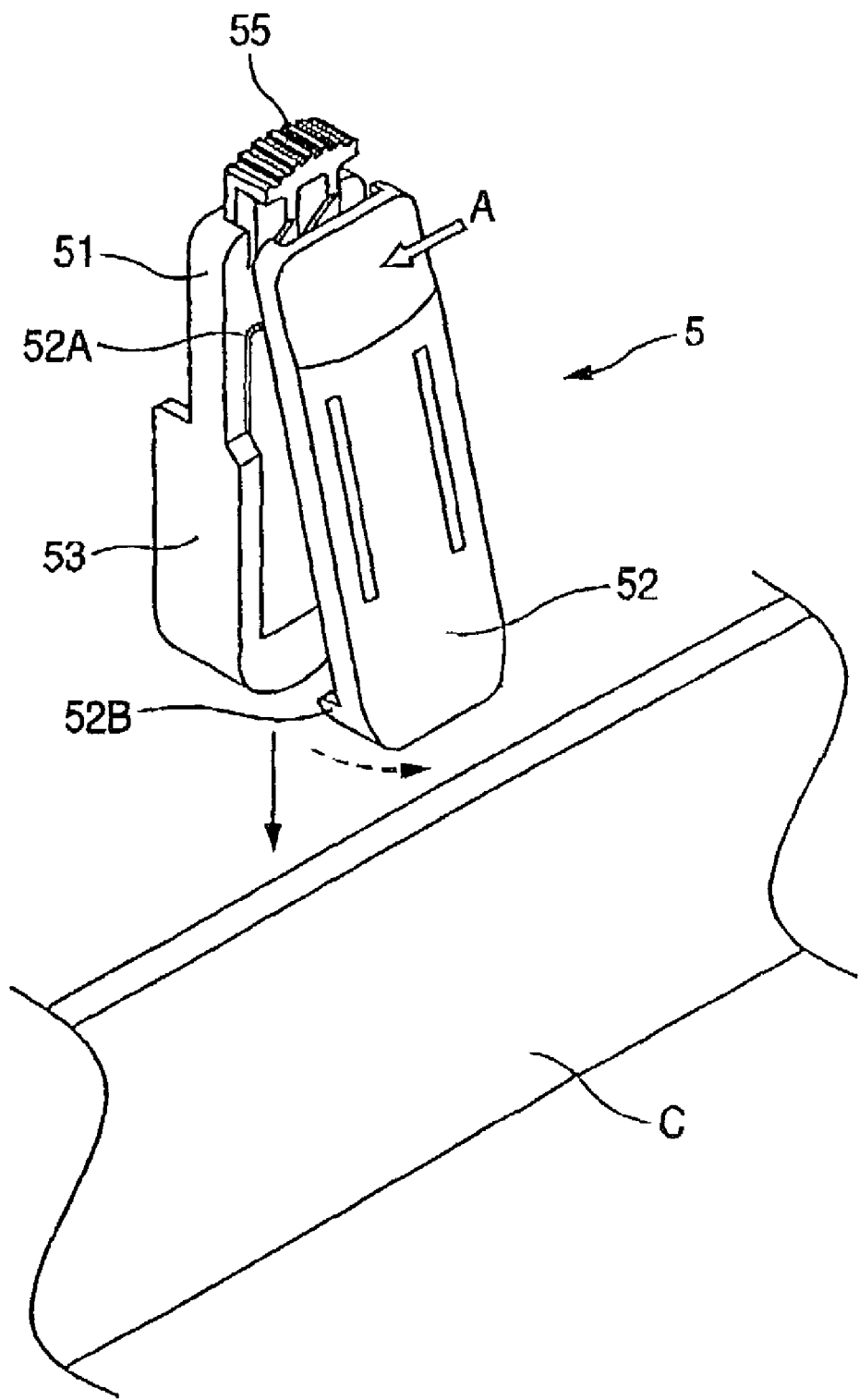
FIG. 4 is an explanatory view of a carrying holder mounting thereon the cellular phone securing device according to the first embodiment shown in FIG. 1.

The mounting portion 52 is formed in a substantially rectangular plate having almost the same size as the main body portion 51, the upper end portion side of the mounting portion 52 is connected to the main body portion 51 through a substantially U-shaped plate spring member 52A, and the lower end portion side of the mounting portion 52 is open in an alligator mouth shape, That is, the mounting portion 52 is structured such that, as shown in FIG. 4, in a case where the upper end portion thereof is pushed in the main body portion 51 direction (in FIG. 4, in the A direction) against the spring force of the mounting portion 52 to thereby open the lower end portion side thereof, the mounting portion 52 can be inserted into and held by a belt C. On the lower end of the mounting portion 52, there is provided a securing projection 52B (see FIG. 4) which projects toward the main body portion 51, thereby being able to prevent the mounting portion 52 from being removed from the belt C easily.

The fixing projection 54 is structured such that, on the lower end portion side of the main body portion 51, it is able to project and retreat with respect to the surface of the main body portion 51 and is normally projected from the surface of the main body portion 51 by a spring (not shown). That is, in a case where the projecting shaft 4 of the cellular phone securing device 2 is inserted down to the lower end portion side of the main body portion 51, the fixing projection 54 is fitted into and locked to the securing hole 41A (see FIG. 1) opened up in the flange portion 41 which is formed in the upper end portion of the projecting shaft 4, thereby being able to fix and hold the cellular phone securing device 2.

Also, the fixing projection 54 is also structured such that, in FIG. 3, in a case where the lock removing portion 55 thereof is depressed downwardly of the main body portion 51, the energizing operation applied to the fixing projection 54 by the spring can be removed. In this case, the locked condition of the projecting shaft 54 is also removed and, therefore, the cellular phone securing device 2 can be removed from the carrying holder 5.

Next, description will be given below of the operation of the cellular phone securing device 2 according to the present embodiment.

The cellular phone securing device 2 according to the present embodiment is secured in the two positions of the two end portions thereof to the casing 10 of the cellular phone 1 and is thereby fixed in a bridge manner (or in an arch manner): in other words, the cellular phone securing device 2 is mounted to the casing 10 so as to sit astride it between at least two positions respectively existing in the upper end portion and middle portion of the casing 10, while the cellular phone securing device 2 is mounted in such a manner that the back surface of the main body portion 3 can be kept not in contact with it.

Therefore, for example, even in a case where the cellular phone 1 drops down from the back surface portion side thereof and the cellular phone securing device 2 is thereby collided with the ground, because the cellular phone securing device 2 is structured so as to be able to stand firm in a bridge manner, the collision impact can be absorbed and damped. This can prevent troubles that the battery can be detached from the battery cover 12 and a printed circuit board disposed in the interior portion of the casing 10 of the cellular phone 1 can be damaged.

[Second Embodiment]

Next, description will be given below of an onboard holder according to a second embodiment of the invention with reference to the accompanying drawings. In the second embodiment, the same parts as in the first embodiment are given the same designations and thus the duplicate description thereof is omitted here.

Figure 5:
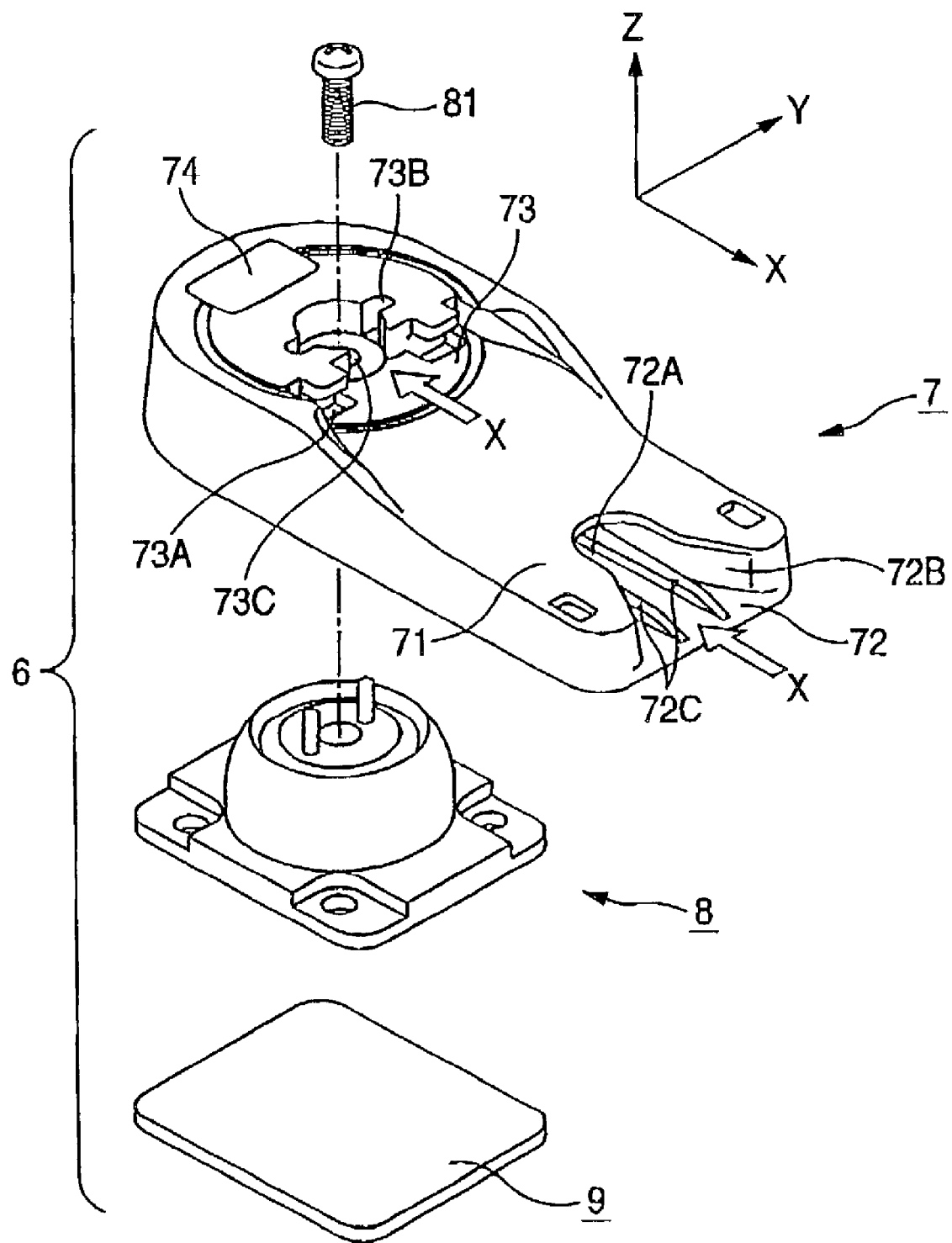
FIG. 5 is an exploded perspective view of an onboard holder according to a second embodiment of the invention.
Figure 6:
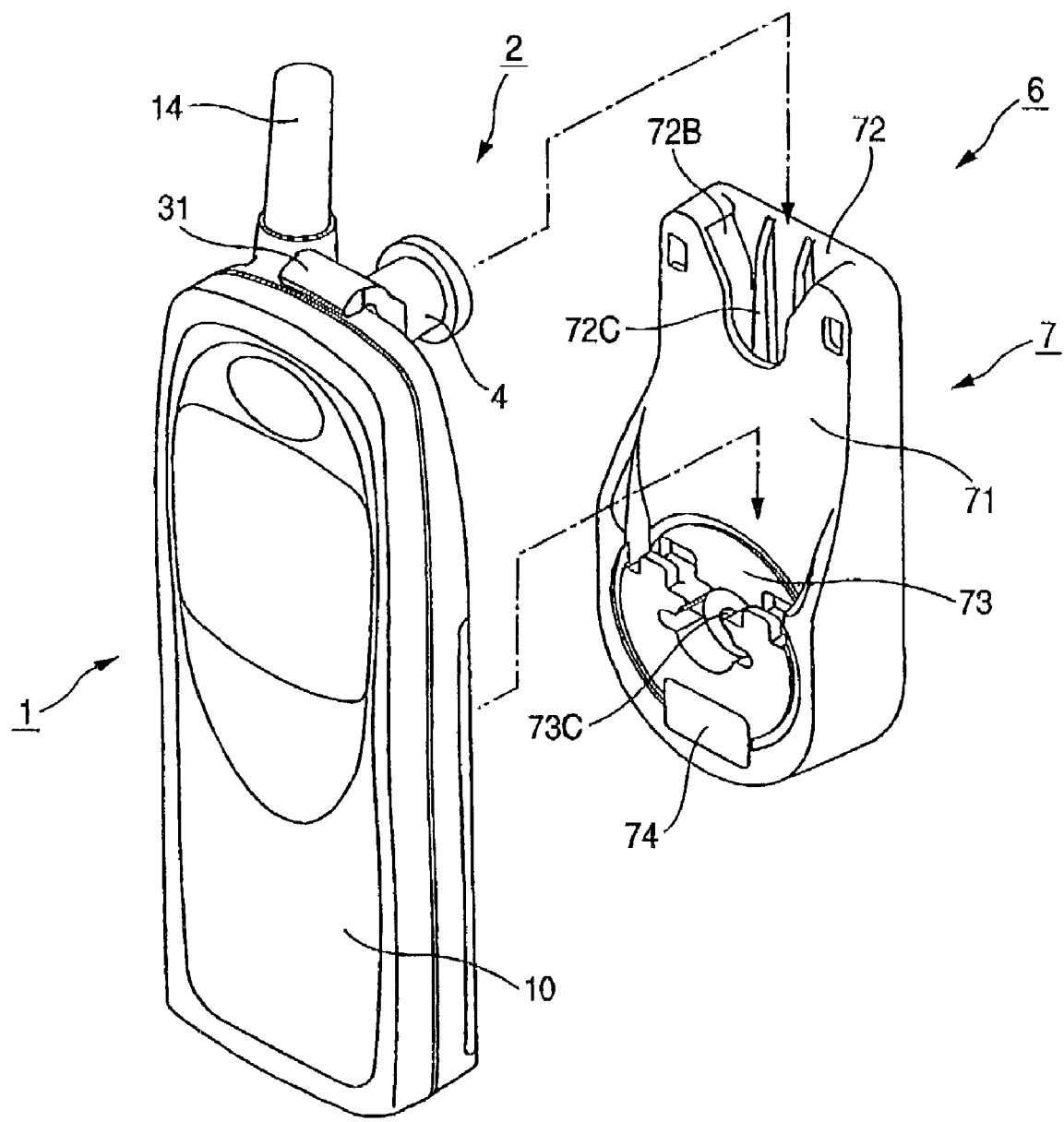
FIG. 6 is a perspective view of the onboard holder according to the second embodiment shown in FIG. 5 and a cellular phone, showing a state in which the latter is mounted onto the former.

Now, FIG. 5 shows an onboard holder 6 according to the second embodiment of the invention. The present onboard holder 6 includes a main body portion 7 and a base portion 8 and is structured such that it can fix and hold the cellular phone 1 in a rotation preventive manner through the cellular phone securing device 2 used in the first embodiment.

The main body portion 7 includes, on the front surface 71 side thereof, a mounting portion 72 and a holding portion 73. The mounting portion 72 sandwiches and mounts the cellular phone securing device 2 from both sides thereof (in FIG. 5, in the Y direction) with spring forces, whereas the holding portion 73 sandwiches and holds, or, fixes the cellular phone securing device 2 physically from both sides thereof and from upper and lower sides thereof (in FIG. 5, in the Y and Z directions).

Figure 7:
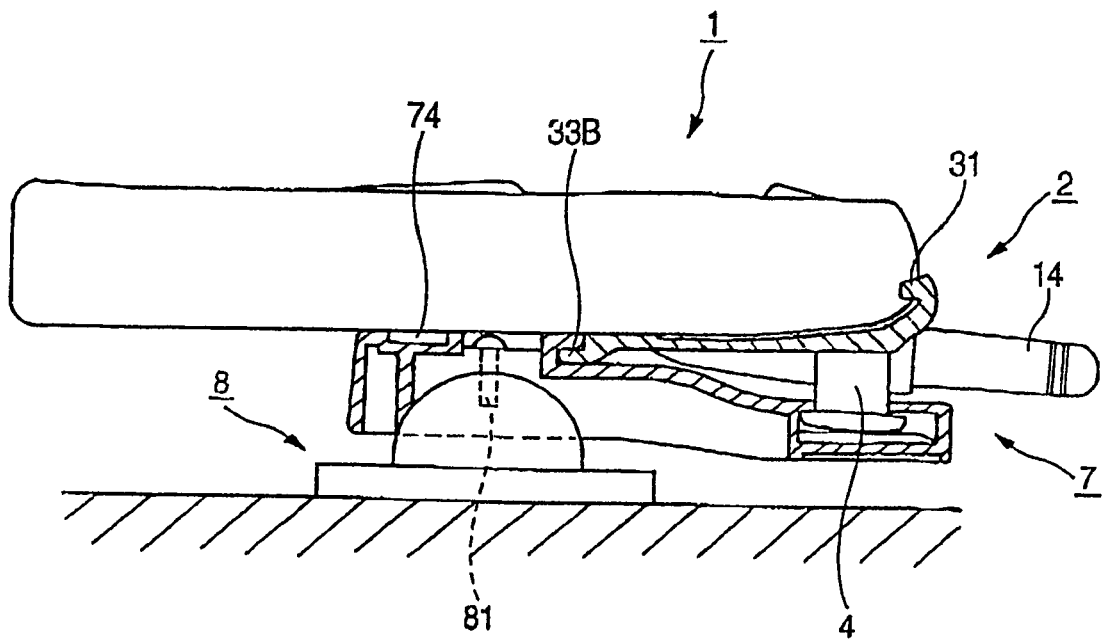
FIG. 7 is an explanatory view in which the onboard holder according to the second embodiment shown in FIG. 5 with the cellular phone mounted thereon through the cellular phone securing device according to the first embodiment shown in FIG. 1 is mounted on the interior of a car body.

The front surface 71 is structured such that the substantially half-section area thereof, which is situated near to one end side thereof and also in which the mounting portion 72 is formed, is lower in position than the other substantially half-section area thereof situated near to the other end side thereof, while the boundary portion between these two areas is inclined. The height difference of the front surface 71, as shown in FIG. 7, is set so as to be able to absorb the expansion amount of the expansion portion 15 on which the antenna base portion of the casing back surface 10A portion of the cellular phone 1 is to be mounted.

The mounting portion 72 is structured such that it can sandwich and mount the projecting shaft 4 of the cellular phone securing device 2 inserted into the deep portion of a slide hole 72A from both sides thereof with spring forces. The slide hole 72A, as shown in FIG. 5, is formed as a horizontal hole extending in parallel to the surface direction of the front surface 71; and, in order to facilitate the insertion of the projecting shaft 4, the entrance portion of the slide hole 72A open in one end portion of the main body portion 7 is spread out toward the outside.

Figure 8:
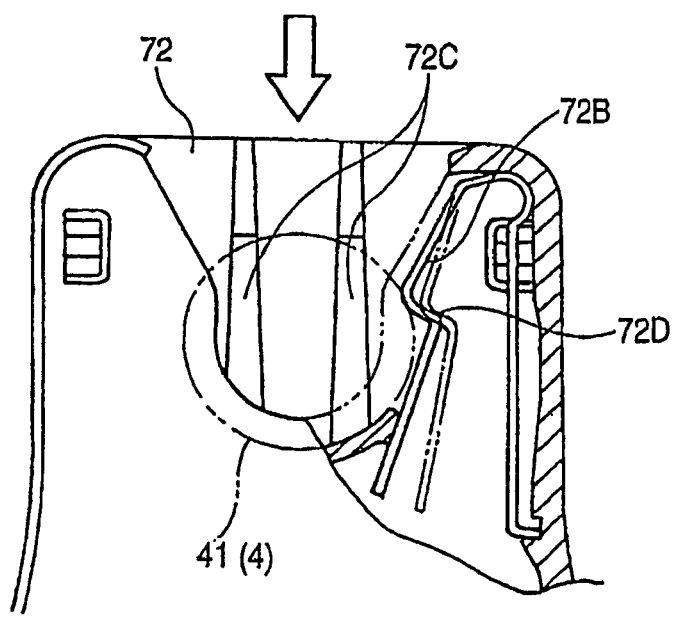
FIG. 8 is a partial section view of the onboard holder according to the second embodiment shown in FIG. 5, showing the shape of a plate spring disposed in the mounting portion thereof; and, FIG. 9 is an enlarged view of the main portions of the cellular phone securing device according to the first embodiment and the onboard holder according to the second embodiment.

Also, on the two side surfaces of the slide hole 72A that are situated near to the above entrance portion, as shown in FIG. 8, there are mounted plate springs 72B respectively. These plate springs 72B are wholly tapered toward their respective deep portions so as to approach each other and, in the middle portions thereof, there are formed stepped portions 72D which prevent the projecting shaft 4 of the cellular phone securing device 2 against removal to thereby lock it temporarily.

Also, on the floor surface portion of the mounting portion 72, in order to be able to insert the projecting shaft 4 smoothly into the deep portion of the mounting portion 72 while minimizing a frictional force between the floor surface and the upper surface of the projecting shaft 4 to be contacted with and slid on the floor surface, there are projectingly provided a pair of narrow walls 72C which extend in the insertion (X) direction.

The holding portion 73 is structured such that the projection portion 33 (see FIG. 1) provided on the cellular phone securing device 2 can be inserted into the holding portion 73 to thereby be able to sandwich and hold the projection portion 33 in such a manner that the movements of the main body portion 7 of the onboard holder 6 in the thickness (Z) direction as well as in the width (Y) direction thereof are physically restricted. As shown in FIG. 5, the holding portion 73 is also structured such that the projection portion 33 can be inserted from the X direction which is the same direction as in the mounting portion 72.

The holding portion 73 according to the present embodiment includes a horizontal hole 73A for restricting and holding part of the projection portion 33 (the horizontal member 33A shown in FIG. 1) from the thickness (Z) direction of the main body portion 7, and a vertical hole 73B for restricting and holding the remaining portion of the projection portion 33 (the vertical member 33B shown in FIG. 1) from the width (Y) direction; and, in order to be able to fix the projection portion 33 with no play, the horizontal and vertical holes 73A and 73B are formed in dimension in conformity with the horizontal and vertical members 33A and 33B.

In the central portion of the holding portion 73, there is formed a screw hole 73C for fixing the base portion 8 to the back surface side which is opposite to the front surface 71 side. Also, nearer to the end portion of the onboard holder 6 than the holding portion 73, there is disposed a flexible pad portion 74. That is, when the cellular phone 1 is fixed to and held by the onboard holder 6, the pad portion 74 absorbs the vibrations of the cellular phone 1 on the car body side to thereby prevent the vibrations from being transmitted to the back surface 10A of the casing.

On the other hand, the base portion 8 is used to fix the onboard holder 6 to the interior of a vehicle such as a car. That is, when threadedly mounting the onboard holder 6 onto the interior of the car using a screw, this base portion 8 is to be used. Also, the base portion 8 is structured such that the main body portion 7 can be inclined at an inclination angle desired by a user with respect to the substantially trapezoidal-shaped upper portion of the base portion 8 and can be connected integrally to the upper portion of the base portion 8. Between the base portion 8 and main body portion 7, there is interposed an inclination adjust mechanism (not shown).

When fixing the onboard holder 6 directly to the interior of the vehicle using a screw, this base portion 8 is used; but, to avoid such screw fixation, for example, there may be interposed between them a stick plate 9 with both surfaces covered with adhesives. That is, the base portion 8, which is united with the main body portion 7 screwed thereto, may be fixedly secured to the surface of the stick plate 9 and, at the same time, the back surface of the stick plate 9 may be fixedly secured to the vehicle body.

As has been described heretofore, according to the invention, a cellular phone securing device includes a first securing member to be secured to an erect surface in a battery mounting recessed portion formed on the back surface side of a casing of a cellular phone, and a second securing member to be secured to a recessed portion formed in the upper end face of the casing. In other words, the present cellular phone securing device is structured such that it can be mounted on a cellular phone so as to sit astride the cellular phone at least between the two positions of the casing through the first and second securing members. According to this structure, the back surface of the central portion of the cellular phone securing device can be prevented from touching the back surface portion of the cellular phone casing on which the cellular phone securing device is to be mounted. Owing to this, even in the portion of the casing in which a speaker, is installed, the present cellular phone securing device can be mounted in such a manner that it does not close the casing portion but sits astride it. That is, the present cellular phone securing device can be disposed even in the portion where the speaker is installed.

Also, since the present cellular phone securing device is not fixedly secured to the casing of the cellular phone with adhesives, it can be mounted onto and removed from the cellular phone according to the taste of a user; that is, the present cellular phone securing device is free to use and is thus convenient for the user to handle it.

Further, according to the present cellular phone securing device, by inclining the upper surface portion of a projecting shaft provided on and projected from the present cellular phone securing device, the portion of the casing of the cellular phone with the antenna mounted thereon can be kept most distant from a carrying holder. Owing to this, even in the case of a cellular phone securing device in which the projecting amount of the projecting shaft is reduced as much as possible, the antenna can be prevented from touching the carrying holder. This makes it possible to provide a cellular phone securing device which is minimized in the bulk amount thereof and thus is easy to use.

Also, according to another aspect of the invention, there is provided an onboard holder which includes a mounting portion for sandwiching and mounting a projecting shaft from both sides thereof using spring forces, and a holding portion for receiving a projection portion formed in a cellular phone securing device to sandwich and hold the projection portion. According to the present onboard holder, when the cellular phone is mounted on it, the cellular phone can be firmly fixed to the interior of a car, thereby being able to prevent the cellular phone from oscillating greatly according to the oscillation of a vehicle body. This can prevent the cellular phone from colliding with something existing in the interior of the vehicle, can facilitate the mounting and removal of the cellular phone with respect to the present onboard-holder, and can realize an easy key operation while mounting the cellular phone on the present onboard holder.

While only certain embodiments of the invention have been specifically described herein, it will be apparent that numerous modifications may be made thereto without departing from the spirit and scope of the invention.

What is claimed is:

1. A cellular phone securing device comprising:
    one of a carrying holder fixable to a belt or clothes of a user and an onboard holder installable in a vehicle,
    a portable casing, and
    a securing apparatus, said securing apparatus comprising:
    a main body portion;
    a holding member disposed erect on a surface of said main body portion and be slidably engaged with said one of the carrying holder and the onboard holder; and a securing portion provided on and projected from at least two positions of said main body portion and secured to at least two positions of the casing to thereby be able to secure said main body portion while keeping it not in contact with the casing.

2. The cellular phone securing device according to claim 1, wherein said holding member is a cylindrical-shaped projecting shaft.

3. The cellular phone securing device according to claim 2, wherein said projecting shaft includes a securing hole into which a fixing projection disposed on the carrying holder can be rotatably inserted, and said securing hole is open in a central portion of an upper surface of said projecting shaft.

4. The cellular phone securing device according to claim 2, wherein an upper surface portion of said projecting shaft has a shape inclined such that it lowers in height toward the central portion of said main body portion with respect to a longitudinal direction of said main body portion.

5. The cellular phone securing device according to claim 2, wherein said securing apparatus is inclinedly mounted so that an area of provision of said projecting shaft can be spaced by the maximum distance from a surface of the carrying holder on which said securing apparatus is to be mounted.

6. The cellular phone securing device according to claim 1, wherein said securing portion includes:
- a first securing member to be secured to an erect surface of an edge portion of a battery-storing recessed portion formed on a back surface side of the casing; and
- a second securing member to be secured to a recessed portion formed in one end face of the casing.

7. A securing device which is removably mountable onto a cellular phone, through which the cellular phone is removably and rotationally mountable onto a carrying holder removably fixed on a belt or clothes of a user, and through which the cellular phone is removably and immovably mountable onto an on-board holder fixed to an interior of a vehicle, the securing device comprising:
- a main body portion extending in an extending direction;
- a first securing portion projected from a first end portion of the main body portion;
- a second securing portion projected from a second end portion of the main body portion, the second end portion being located opposite from the first end portion in the extending direction;
- a holding member projected from the main body portion in a first projecting direction opposite from a second projecting direction in which the first and second securing portions are projected from the main body portion; and
- a third securing portion provided on the main body portion and spaced from the holding member second securing portion in the extending direction, wherein:
- the securing device is removably mountable onto the cellular phone such that the first and second securing portions are removably mounted onto a casing of the cellular phone in a state in which the main body portion is in non-contact with the casing of the cellular phone;
- the cellular phone is removably and rotationally mountable onto the carrying holder through the securing device such that the holding member is removably and rotatably received by the carrying holder; and
- the cellular phone is removably and immovably mountable onto the on-board holder such that the holding member and the third securing portion are removably received by the on-board holder.

8. A combination of an onboard holder installable in an interior of a vehicle and a securing device fixable to a portable electronic device, the onboard holder capable of mounting immovably and removably the securing device, said onboard holder comprising:
- a main body portion;
- a mounting portion for sandwiching and mounting a first projection disposed on the securing device from both sides with spring forces; and
- a holding portion for receiving a second projection disposed on the securing device to thereby sandwich and hold the second projection.

9. The combination according to claim 8, wherein said main body portion includes:
- a stepped portion formed on the front surface side and having a height corresponding to an expansion amount of a predetermined amount.

10. The combination according to claim 8, said onboard holder further including:
- a base portion; and
- an inclining member for mounting said main body portion inclinably onto said base portion to be fixed to a vehicle body side.

11. The combination according to claim 8, wherein the securing device includes:
- a main body portion;
- a holding member disposed erect on a surface of said securing device main body portion to be fixed to and held by the onboard holder; and
- a securing portion for fixing the securing device to the portable electronic device provided on and projected from at least two positions of said securing device main body portion.

* * * * *